（12） United States Patent
Mihara

(10) Patent No.: US 11,179,013 B2
(45) Date of Patent: *Nov. 23, 2021

(54) FLUID DAMPER DEVICE AND APPARATUS WITH THE DAMPER

(71) Applicant: NIDEC SANKYO CORPORATION, Nagano (JP)

(72) Inventor: Naoya Mihara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 407 days.

This patent is subject to a terminal disclaimer.

(21) Appl. No.: 16/316,045

(22) PCT Filed: May 12, 2017

(86) PCT No.: PCT/JP2017/018017
§ 371 (c)(1),
(2) Date: Jan. 8, 2019

(87) PCT Pub. No.: WO2018/207341
PCT Pub. Date: Nov. 15, 2018

(65) Prior Publication Data
US 2021/0196088 A1    Jul. 1, 2021

(51) Int. Cl.
*A47K 13/12* (2006.01)
*F16F 9/14* (2006.01)

(52) U.S. Cl.
CPC .............. *A47K 13/12* (2013.01); *F16F 9/145* (2013.01)

(58) Field of Classification Search
USPC ........................................................... 4/236
See application file for complete search history.

(56) References Cited

FOREIGN PATENT DOCUMENTS

| CN | 2804490 | 8/2006 |
|---|---|---|
| CN | 103154560 | 6/2013 |
| CN | 204698437 | 10/2015 |
| CN | 106175559 | 12/2016 |
| JP | H05240284 | 9/1993 |
| JP | H06112538 | 4/1994 |

(Continued)

OTHER PUBLICATIONS

"International Search Report (Form PCT/ISA/210)" of PCT/JP2017/018017, dated Aug. 15, 2017, with English translation thereof, pp. 1-4.

(Continued)

*Primary Examiner* — Christine J Skubinna
(74) *Attorney, Agent, or Firm* — JCIPRNET

(57) ABSTRACT

The fluid damper device (10) has the rotor (30) which is inserted to the bottomed cylindrical case (20) and the cover (60) which is fixed to the opening portion (29) of the case (20). The welding protrusions (80) which are to be welded to the cover (60) are formed on the inside circumferential surface of the case (20) and spaced out in the circumferential direction. On the other side (L2) in the axial (L) direction of the welding range (X), within which the welding protrusions (80) and the cover are welded together, the first outflow prevention portion (91L, 91R) is formed. On the other side (L2) of the first outflow prevention portion (91L, 91R) in the axial (L) direction, the arc-shaped step surface (76) which functions as the outflow regulation portion (95) is provided to regulate the resin protruded and prevented it from reaching the position of the R-ring (49).

22 Claims, 9 Drawing Sheets

(56) References Cited

FOREIGN PATENT DOCUMENTS

Figure 1:
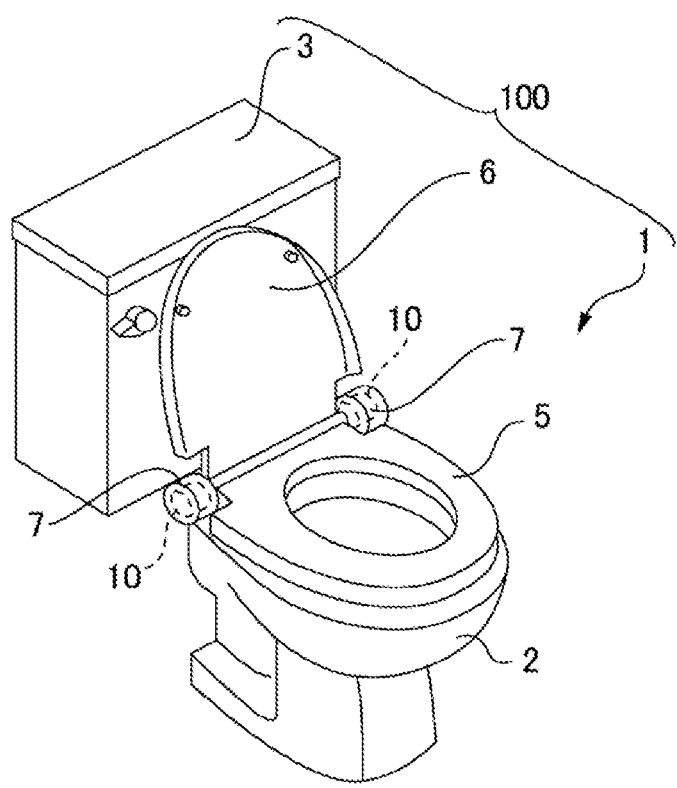

| | | |
|---|---|---|
| JP | 2002021903 | 1/2002 |
| JP | 2002155925 | 5/2002 |
| JP | 2005140287 | 6/2005 |
| JP | 2006112538 | 4/2006 |
| JP | 2016223538 | 12/2016 |
| KR | 950032931 | 12/1995 |

OTHER PUBLICATIONS

"Office Action of China Counterpart Application", dated Mar. 16, 2020, with English translation thereof, p. 1-p. 13.

FLUID DAMPER DEVICE AND APPARATUS WITH THE DAMPER

CROSS-REFERENCE TO RELATED APPLICATION

This application is a 371 application of the International PCT application serial no. PCT/JP2017/018017, filed on May 12, 2017. The entirety of each of the above-mentioned patent applications is hereby incorporated by reference herein and made a part of this specification.

In the fluid damper device of Patent Reference 1, a cover secured to the opening portion of the case prevents the rotor from coming out of the case. As a method of securing the cover, a screw type securing method is used by which a female screw formed on the inside circumferential surface of the case is threadedly engaged with a male screw formed on the outside circumferential surface of the cover. However, the screw type method requires a larger dimension in the axial direction, and the cost of a mold for molding screw parts is high. Therefore, to make the device thinner in the axial direction and reduce the cost, a method of welding is used to secure the cover with the case. To secure the cover to the case by welding, the inside circumferential surface of the case and the edge portion of the cover, which is inserted to the inside of the case, are melted together and then the cover is pushed into the case.

In this case, it is preferred that the outflow regulation portion be provided on one side of the sealing member in the axial direction. In this way, the deformation of the sealing member, which is normally caused by the welding material, can be prevented. Therefore, it is less likely that the sealability of the damper chamber is degraded.

In the present invention, it is preferred that the outflow prevention portion be provided at positions on the other side of said predetermined range in the axial direction and on the inner side in the radial direction of the welding protrusion. In this way, the welding material protruding toward the inner side of the welding protrusion in the radial direction can be held by the outflow prevention portion on the axially other side of the welding range (on the damper chamber side).

In the present invention, it is preferred that the cover have a small diameter portion which is inserted to the case and welded to the welding protrusions and a large diameter portion which has a diameter larger than the small diameter portion, and that the outflow prevention portion provided on one side of the predetermined range in the axial direction be covered by the large diameter portion from one side in the axial direction. In this way, the outflow prevention portion is hidden from outside by the large diameter portion; therefore, the welding material held in the outflow prevention portion won't be seen from outside, presenting a nicer appearance. Even if a small amount of the welding material protrudes from the outflow prevention portion and therefore weld burrs are formed, the weld burrs are covered by the large diameter portion and will not be seen directly from outside; therefore, it is less likely that a step to remove the weld burrs is needed.

In the present invention, it is preferred that, on the inside circumferential surface of the case, a positioning contact portion which abuts on the cover in the axial direction be formed at a circumferential position different from the positions of the welding protrusion, and that one end of the welding protrusion in the axial direction, the positioning contact portion, and the other end of the welding protrusion appear in this order in the axial direction. With this, the tip surface of the cover can be contacted and melted with the welding protrusion, and then the cover can be pushed in to the position at which the tip surface of the cover contacts the positioning contact portion to position the cover in the axial direction. Through this, the bottom end of the welding range (the other-side end portion of the welding range in the axial direction) and the positioning contact portion sit at the axially same positions; therefore, the outflow prevention portion can be formed on the other side of the positioning contact portion in the axial direction. Also, the welding protrusion and the positioning contact portion are formed at the circumferentially different positions; therefore, it is less likely that the positioning contact portion will be deformed. Therefore, the axial positioning of the cover can be precisely performed, facilitating to properly secure the cover. Because of this, the precision in the axial dimension of the damper chamber can be improved, preventing unstable damper performance.

In the present invention, the positioning contact portion is formed at two opposite positions about the center in the radial center of the inside circumferential surface of the case. For example, the positioning contact portion is formed at two positions which are on the straight line extending in the diameter direction of the case and are opposite from each other about the center of the case in the radial direction. Thus, by forming the two positioning contact portions at opposite sides about the radial center, the axial positioning of the cover can be precisely performed. When the two positioning contact portions are formed on the straight line extending in the diameter direction, the cover can be prevented from tilting.

In the present invention, the positioning contact portion is formed at three positions which are distanced from each other in the circumferential direction; two of the three positions are located opposite from the remaining one position of said three positions with respect to the radial center of the case. For example, the positioning contact portion is formed at three positions which are distanced at equal angle intervals about the radial center of the inside circumferential surface of the case. Thus, two of three positions distanced from each other in the circumferential direction are arranged on the opposite side from the remaining one with respect to the radial center of the case, the axial positioning of the cover can be precisely performed. Particularly, the positioning contact portions are provided at equal distance in the circumferential direction so that the axial positioning of the cover can be precisely performed, preventing the cover from tilting.

(Apparatus Equipped with Damper)

FIG. 1 is an explanatory diagram of a western style toilet unit 100 equipped with a western style toilet 1 to which a fluid damper device 10 of the present invention is mounted. The western style toilet unit 100 shown in FIG. 1 is equipped with a western style toilet 1 (an apparatus with a damper) and a water tank 3. The toilet 1 is provided with a toilet main body 2 (an apparatus main body), a resin seat 5 (an open/close member), a resin lid 6 (an open/close member) and a damper device cover 7. Inside the damper device cover 7, a fluid damper device 10 is incorporated for both the seat and the lid; the seat 5 and the lid 6 are respectively connected to the toilet main body 2 via the fluid damper device 10. Here, the identical configuration can be used for the fluid damper device 10 connected to the seat 5 and the fluid damper device 10 connected to the lid 6. In the description below, the fluid damper device 10 connected to the seat 5 is described.

Figure 2:
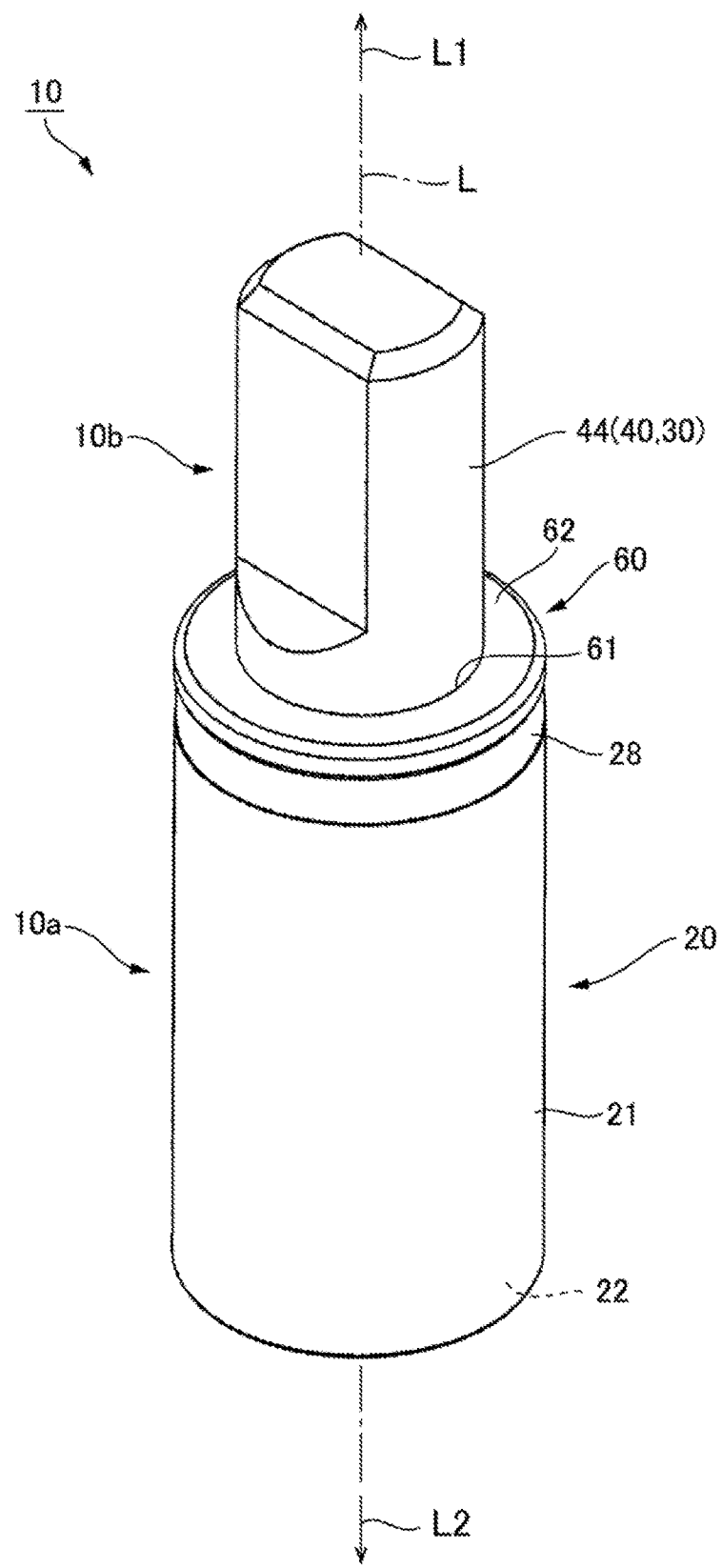
Figure 3:
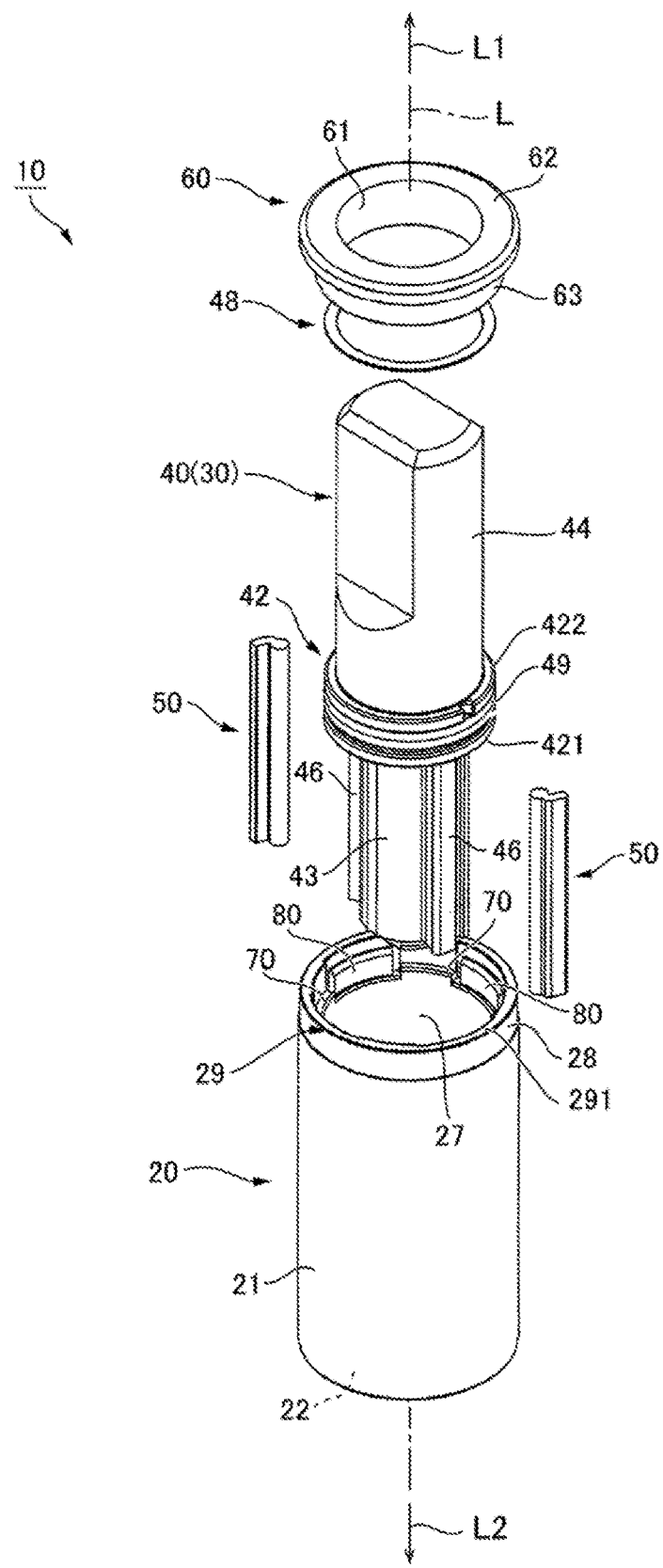

FIG. 2 is a perspective view of the fluid damper device 10, observed from one side L1. The fluid damper device 10 is equipped with a cylindrical fluid damper device main body 10a which extends in the axial L direction and a coupling shaft 10b which protrudes from the fluid damper device main body 10a toward one side L1. The coupling shaft 10b is coupled to the seat 5. The tip end portion of the coupling shaft 10b is created with flat surfaces facing each other so that idling between the coupling shaft 10 and the seat 5 is prevented. The fluid damper device 10 produces a force (the rotation load) against the force of the seat 5 when coming down over the toilet main body 2 from a standing position, to reduce the falling speed of the seat 5.

The contact surface on which the washer 48 and the second flange 422 make contact with each other is also a sliding surface which slides when the rotor 30 rotates. In other words, the rotor 30 is configured such that the surface on one side L1 of the second flange 422 functions as a sliding surface which slides against the washer 48. By manufacturing the washer 48 of metal, the sliding surface can be prevented from wearing. Note that it is preferred that a lubricant material such as grease be coated on the sliding surface.

(Damper Chamber)

Figure 5:
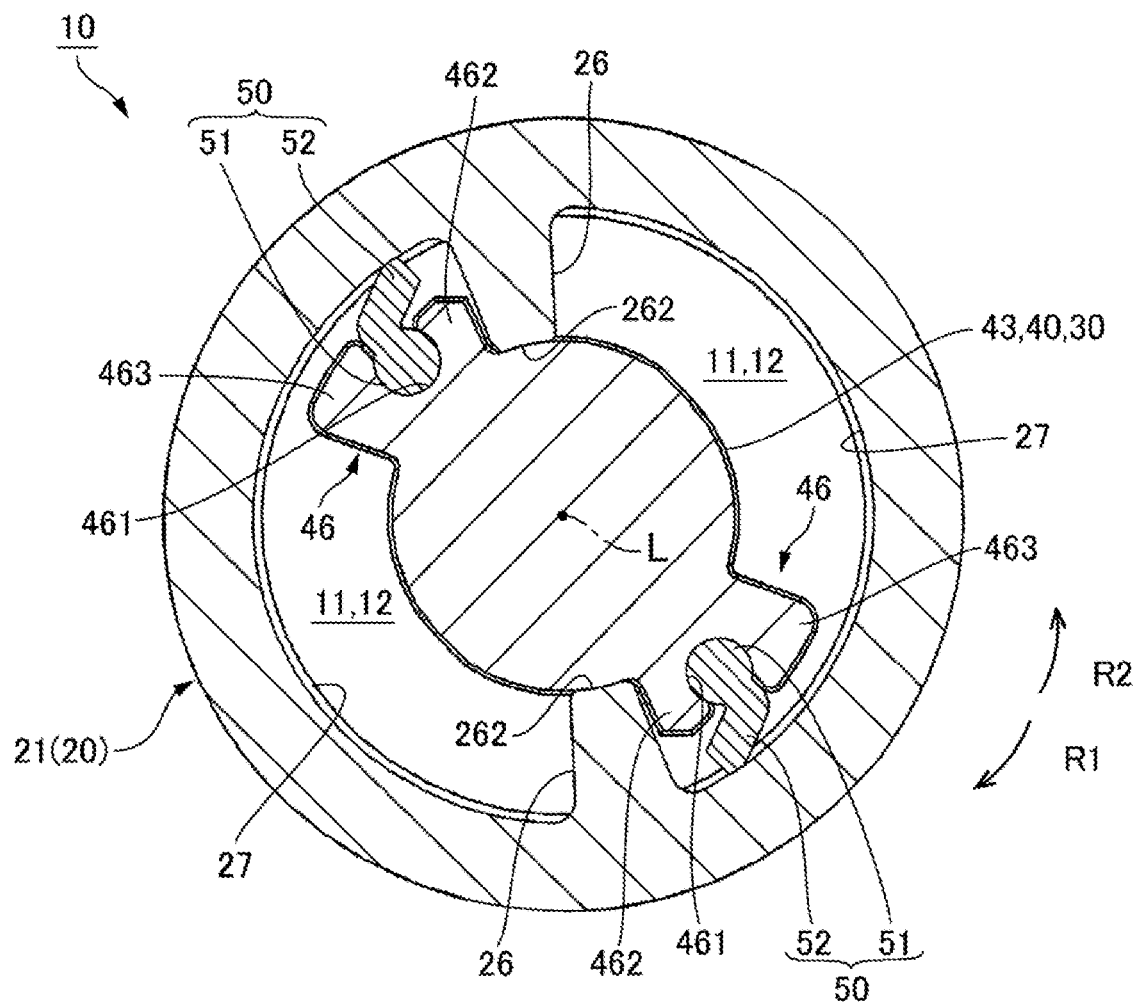

As shown in FIG. 5, the annular damper chamber 11 is provided between the body portion 21 and the first shaft portion 43. The inner-side end surface 262 of the partition protrusion 26 which protrudes toward the inner side from the inside circumferential surface of the body portion 21 contacts the outside circumferential surface of the first shaft portion 43. Therefore, the damper chamber 11 is divided into two chambers of the same shape by the partition protrusions 26 at two positions. At the two positions which are distanced from each other by 180° circumferentially on the outside circumferential surface of the first shaft portion 43, valve holding portions 46 are formed. The valve holding portions 46 at the two positions are formed in the same shape, and each of them protrudes from the outside circumferential surface of the first shaft portion 43 toward the outer side in the radial direction. Also, the valve holding portions 46 extend to the end portion of the first shaft portion 43 on the other side L2, and the end portion of the first shaft portion 43 on one side L1 is connected to the first flange 421.

Figure 4:
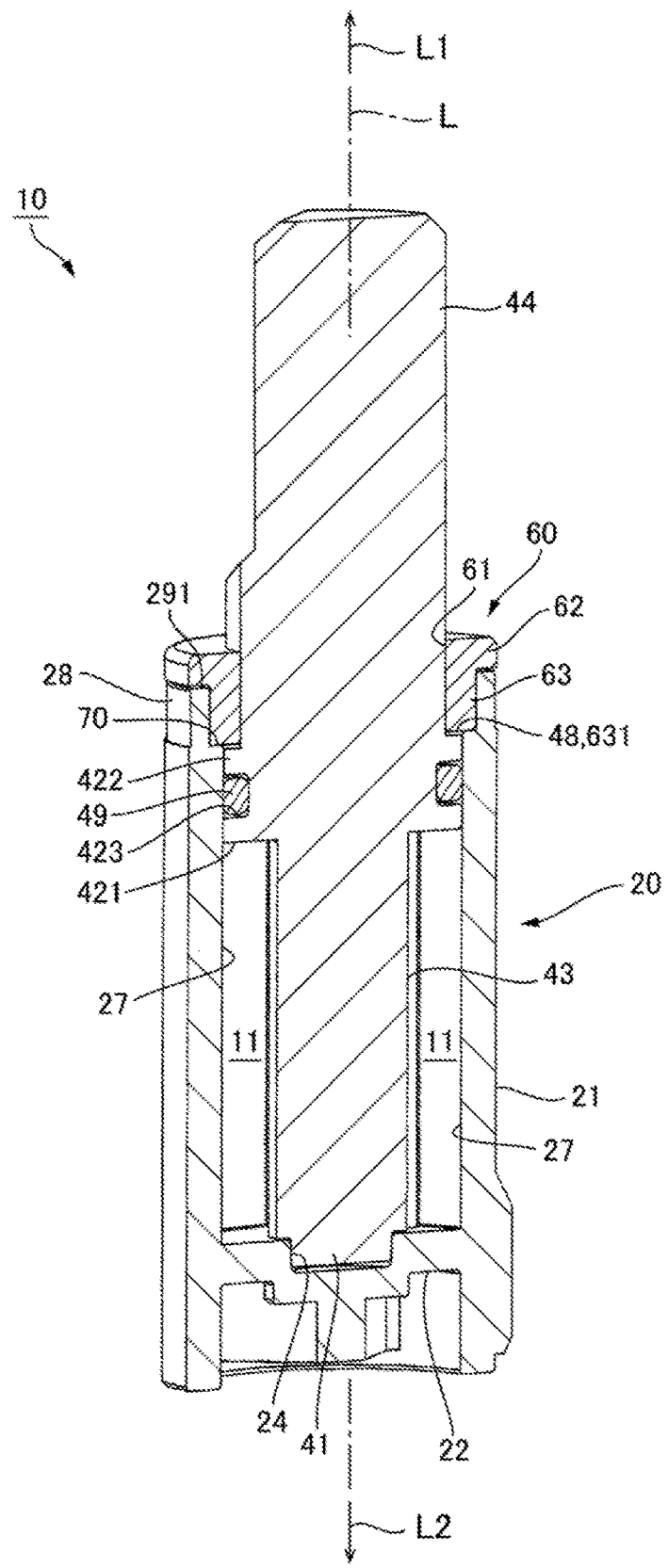

As shown in FIG. 4, a thin portion 28 is formed at the end portion of the body portion 21 on one side L1 in the axial L direction in the case 20. The inside circumferential surface of the body portion 21 has a cylindrical inside circumferential surface 27 to which the partition protrusions 26 are formed, and the thin portion 28 is formed on the part of the cylindrical circumferential surface 27 on one side L1 in the axial L direction. Between the cylindrical inside circumferential surface 27 and the thin portion 28, positioning contact portions 70 are formed facing one side L1 in the axial L direction, and the inside circumferential surface of the thin portion 28 is connected to the cylindrical inside circumferential surface 27 via the positioning contact portions 70. The cover 60 is positioned in the axial L direction by having the annular end surface 631 of the small diameter portion 63 contact with the positioning contact portions 70. In the cover 60, the small diameter portion 63 and the thin portion 28 are welded together at the position circumferentially different from the positioning contact portions 70, as described later.

Figure 6:
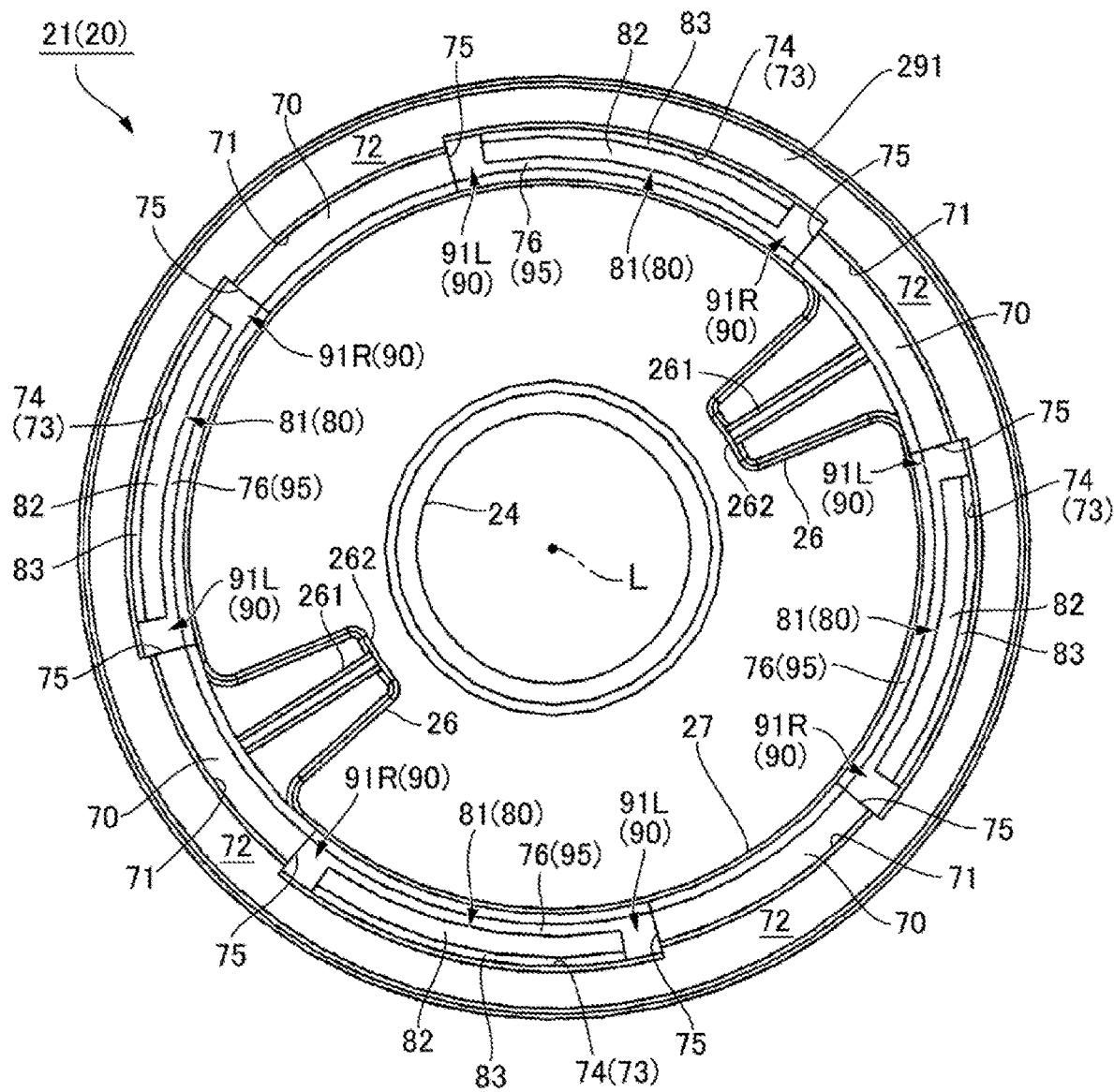
Figure 7:
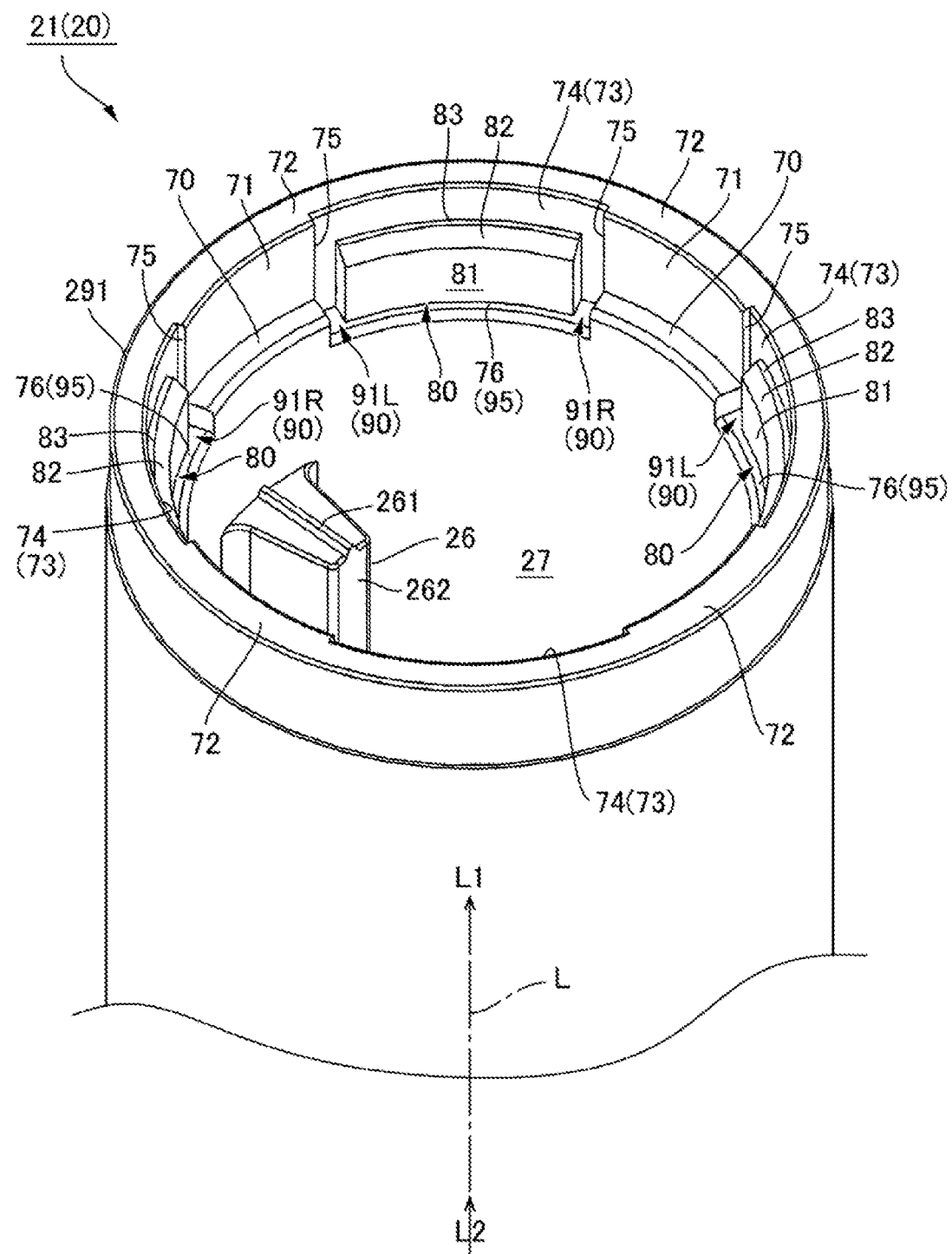

As shown in FIG. 6 and FIG. 7, the positioning contact portion 70 is formed circumferentially part of the inside circumferential surface of the thin portion 28. In this embodiment, the positioning contact portions 70 are formed at four positions with an equal angular interval. The positioning contact portion 70 extends in a predetermined angle range in an arc shape along the circumferential direction. The inside circumferential edge of the positioning contact portion 70 is chamfered in an R shape and connected to the cylindrical inside circumferential surface 27. The outside circumferential edge of the positioning contact portion 70 is connected to the arc-shaped inside circumferential surface 71 which stands up toward one side L1 in the axial L direction. The arc-shaped inside circumferential surface 71 is also the inside circumferential surface of the thin portion 28, which is made in an arc shape about the central axial line (the axial line L) of the case 20. The cover 60 is positioned in the direction perpendicularly intersecting with the axial line L by having the outside circumferential surface of the small diameter portion 63 and the arc-shaped inside circumferential surface 71 make contact with each other in the radial direction. The arc-shaped inside circumferential surface 71 is connected to the opening end surface 291 which is the end surface of the case 20 on one side L1 in the axial L direction. The portion of the opening end surface 291, which is connected to the arc-shaped inside circumferential surface 71, is made as a wide portion 72, the axial width of which is larger than other portions of the opening end surface. The entire opening end surface 291 of the case 20, including the wide portion 72, is covered by the large diameter portion 62 of the cover 20 from one side L1 in the axial L direction. In this embodiment, the positioning between the cover 60 and the case 20 in the axial L direction is done as the positioning contact portions 70 and the small diameter portion 63 make contact with each other. Therefore, the opening end surface 291 of the case 20 and the large diameter portion 62 are not in contact in the axial L direction, but they are opposed to each other having a gap therebetween.

As shown in FIG. 6 and FIG. 7, recessed parts 73, which are created by indenting the area between the circumferentially-adjacent stops 70 toward the outer side in the radial direction and the other side L2 in the axial L direction, are formed around the inside circumferential surface of the thin portion 28. In this embodiment, four recessed parts 73 are created at an equal angular interval around the inside circumferential surface of the thin portion 28. The inside circumferential surface of the recessed part 73 has an arc-shaped inside circumferential surface 74 which faces to the inner side in the radial direction, a pair of side surfaces 75, which rise from both of the circumferential sides of the arc-shaped inside circumferential surface 74 toward the inner side in the radial direction, and an arc-shaped step surface 76 which is connected to the arc-shaped inside circumferential surface 74 and to the edges of the side surfaces 75 on the other side L2 in the axial L direction. The recessed part 73 is indented more to the other side L2 in the axial L direction than the position of the positioning contact portion 70. Therefore, the arc-shaped step surface 76 is positioned on the other side L2 of the positioning contact portion 70 in the axial L direction. The arc-shaped step surface 76 is a planar surface facing one side L1 in the axial L direction and is positioned on the other side L2 of the positioning contact portion 70 in the axial L direction.

The four recessed parts 73 have respectively a welding protrusion 80 formed therein. In other words, four welding protrusions 80 are formed at an equal angular interval on the thin portion 28; the welding protrusions 80 are arranged at different circumferential positions from the positioning contact portions 70. The welding protrusion 80 consists of a portion which is to be contacted and welded to the small diameter portion 63 and a portion which is not to be welded when the small diameter portion 63 of the cover 60 is inserted into the thin portion 28 and ultrasonically welded.

In other words, it is not the entire welding protrusion 80 that is welded to the small diameter portion 63, but it is only a part of the welding protrusion 80 that is welded to the small diameter portion 63. The welding protrusion 80 protrudes from the arc-shaped inside circumferential surface 74 to the inner side in the radial direction and rise from the arc-shaped step surface 76 of the recessed part 73 toward one side L1 in the axial L direction. The welding protrusion 80 extends to a predetermined height in the axial L direction; one end in the axial L direction of the welding protrusion 80, the positioning contact portion 70, and the other end in the axial L direction of the welding protrusion 80 appear in this order in the axial L direction. In other words, the welding protrusion 80 is formed over the range which covers the position in the axial L direction of the positioning contact portion 70. The inside circumferential surface of the welding protrusion 80 is the arc-shaped inside circumferential surface 81 about the axial line L as the center and is positioned more to the inner side in the radial direction than the arc-shaped inside circumferential surface 74 of the positioning contact portion 70. The portion of the welding protrusion 80 on the inner side in the radial direction is the portion (the fusing portion) which will be melted and softened and then integrated to the small diameter portion 63 when the small diameter portion 63 of the cover 60 is fixed by an ultrasonic welding.

Figure 8:
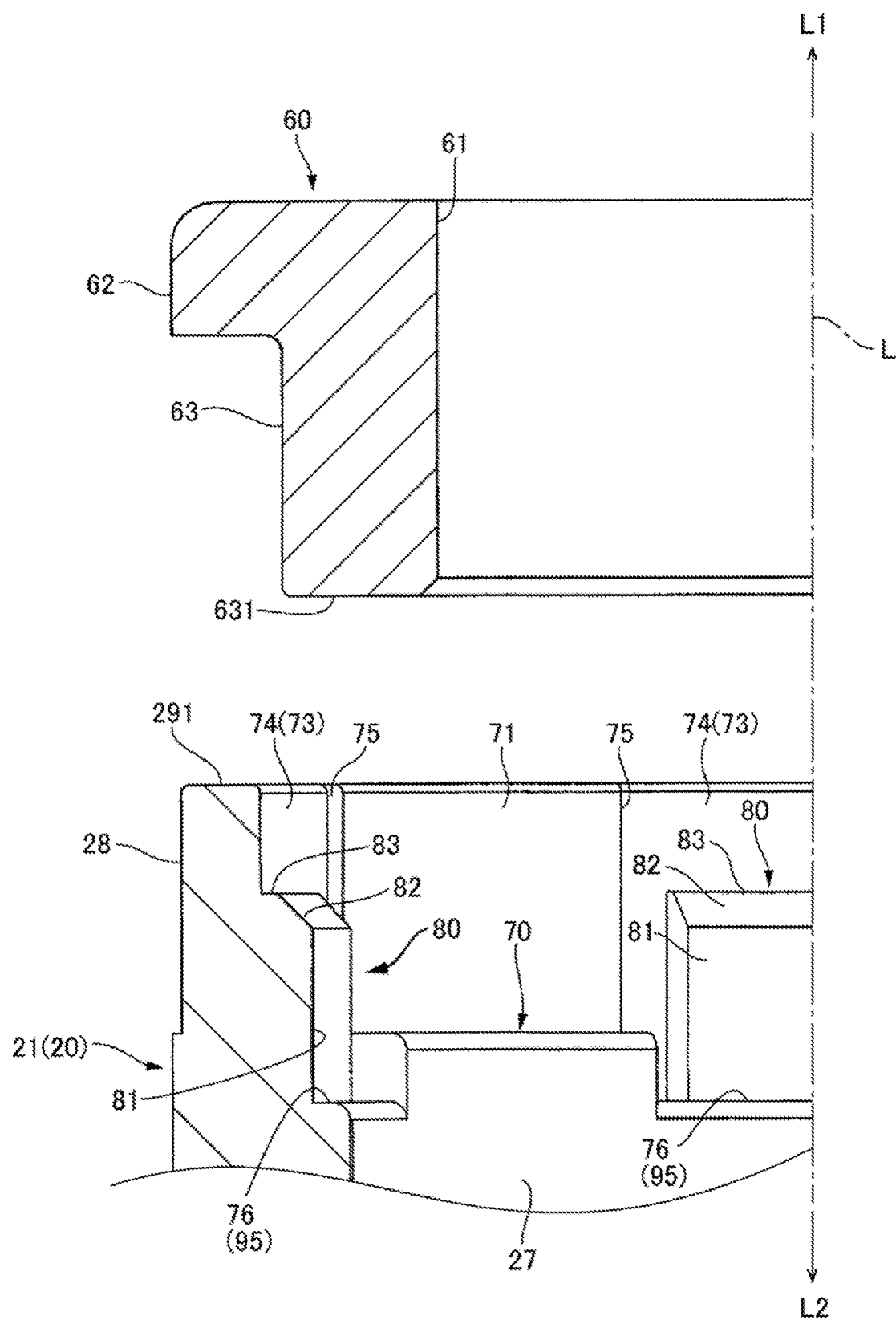
Figure 9:
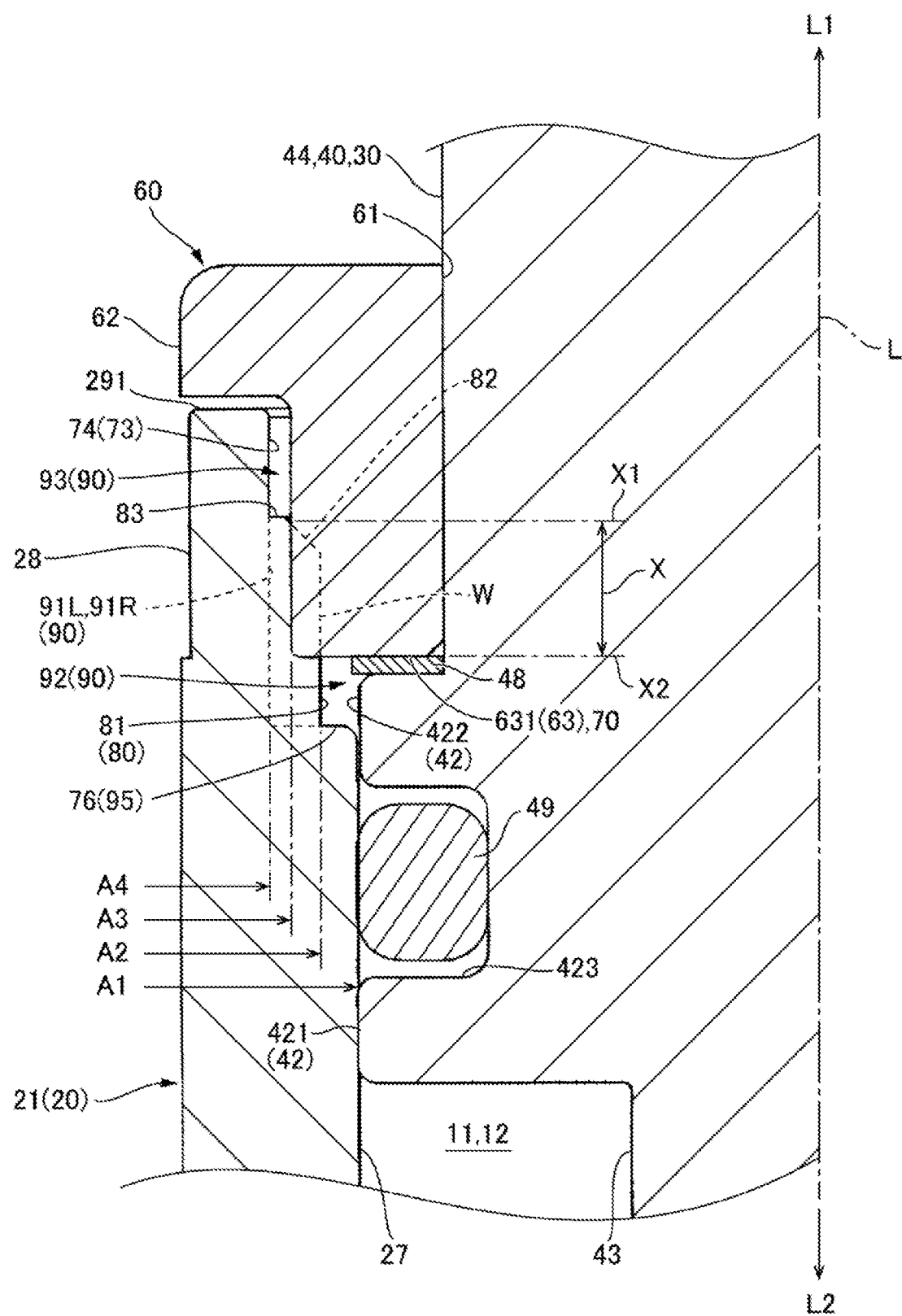

FIG. 8 is a partial cross-sectional view of the state of the damper device in which the case 20 and the cover 60 are separated. FIG. 9 is a partial cross-sectional view of the welding part of the fluid damper device 10. In FIG. 9, the fusing portion of the welding protrusion 80 is indicated by code W. In this embodiment, the tip of the small diameter portion 63 of the cover 60 in inserted to the inside circumferential side of the thin portion 28, and the welding protrusion 80 and the small diameter portion 63 are contacted with each other; then, an ultrasonic welding horn, which is not illustrated, is put against the angle position corresponding to the welding protrusion 80 and applied ultrasonic vibrations from outside the case 20 and the cover 60 to melt and soften the contacting part between the welding protrusion 80 and the small diameter portion 63. At this time, the cover 60 is pressed toward the case 20 so that the small diameter portion 63 is pushed in toward the other side L2 in the axial L direction, and then, the cover 60 can be pushed in until the annular end surface 631 of the small diameter portion 63 makes contact with the positioning contact portions 70. In this way, the cover 60 is positioned in the axial L direction. Once the cover 60 is positioned in the axial L direction by the positioning contact portions 70, the second flange portion 422 of the rotation shaft 40 is positioned in the axial line L direction via the washer 48 by the inside circumferential portion of the annular end surface 631 of the small diameter portion 63. In other words, the push-in amount of the cover 60 into the case 20 is regulated by the positioning contact portions 70. The height of the damper chamber 11 in the axial L direction is also regulated by the positioning contact portions 70.

(Outflow Prevention Portion and Outflow Regulation Portion)

The case 20 of this embodiment is provided with outflow prevention portions 90 at the positions adjacent to the welding protrusions 80 for holding the melted resin (melted material) which is the fluid melted and softened through ultrasonic vibrations. When the melted resin (the melted material) protrudes, the outflow prevention portion 90 functions as a weld burr reservoir to hold the melted resin (the melted material). The outflow prevention portion 90 holds melted resin (a melted material), or it may remain as a space if melted resin (a melted material) does not protrude. Also, the case 20 is provided with an outflow regulation portion 95 for preventing the melted resin from outflowing toward the O-ring 49 which seals the damper chamber 11 on the other side L2 of the outflow prevention portion 90 in the axial L direction. More specifically described, the arc-shaped step surface 76 of the recessed part 73 at which the welding protrusion 80 is formed functions as the outflow regulation portion 95. The arc-shaped step surface 76 (the outflow regulating portion 95) is provided between the welding protrusions 80 and the O-ring 49 to regulate the melted resin (the melted material), which is protruded from the welding protrusion 80, from reaching the O-ring 49. Note that while the inside periphery of the arc-shaped step surface 76 is provided with an R-shaped chamfered portion, the outflow regulation portion 95 includes this chamfered portion.

In this embodiment, the first outflow prevention portions 91L and 91R are provided as part of the outflow prevention portion 90 at the positions adjacent to the welding protrusion 80 in the circumferential direction. As shown in FIG. 7, the first outflow prevention portions 91L and 91R are groove-like gaps provided at both sides of the welding protrusion 80 in the circumferential direction. The first outflow prevention portion 91L, 91R are provided between the welding protrusion 80 and the side surface 75 of the recessed part 73. The first outflow prevention 91L, 91R is formed continual in the axial L direction in the range from the opening end surface 291 provided at the end portion of the case 20 on one side L1 in the axial L direction to the arc-shaped step surface 76 of the recessed part 73.

As shown in FIG. 9 again, a second outflow prevention portion 92, which is provided on the radially inner side of a part on other side L2 of the welding protrusion 80, and a third outflow prevention portion 93, which is provided to a part on the one side L1 of the welding protrusion 80, are formed as other parts of the outflow prevention portion 90. The arc-shaped inside circumferential surface 81 of the welding protrusion 80 is provided at the position which is receded to the radially outer side from the cylindrical inside circumferential surface 27 of the case 20. For this reason, on the radially inner side of the welding protrusion 80 on the other side L2 of the welding range X in the axial L direction, the second outflow prevention portion 92, which is a gap in the radial direction, is created between the arc-shaped inside circumferential surface 81 and the flange 42 of the rotation shaft 40.

Both circumferential ends of the second outflow prevention portion 92 are connected to the above-described first outflow prevention portions 91L and 91R; on the other side L2 of the first outflow prevention portions 91L and 91R and the second outflow prevention portion 92 in the axial L direction is formed an arc-shaped step surface 76 (an outflow regulation portion 95). When the melted resin (the melted material), which has been melted and softened at the time of ultrasonic welding, protrudes to both sides of the welding protrusion 80 in the circumferential direction, the outflow resin is held in the first outflow prevention portions 91L and 91R. In the same manner, when the melted resin (the melted material), which has been melted and softened at the time of ultrasonic welding, protrudes to the radially inner side of the welding protrusion 80 on the other side L2 of the small diameter portion 63 of the cover 60 in the axial L direction, it is held in the second outflow prevention portion 92. The melted resin (the melted material) held in the first outflow prevention portions 91L and 91R and the second outflow prevention portion 92 is retained at the arc-shaped step surface 76 (the outflow regulation portion 95), which is provided on the other side of the first outflow prevention portions 91L and 91R and the second outflow prevention portion 92 in the axial L direction, so that it would not protrude to the position of the R-ring 49. In this way, it is less likely that the O-ring 49 will be deformed by the melted resin (the melted material).

The opening end surface 291 of the case 20 is covered by the large diameter portion 62 of the cover 60 from one side L1 in the axial L direction. The third outflow prevention portion 93 provided on the inside circumferential side of the opening end surface 291 and the first outflow prevention portions 91L and 91R provided at both sides of the third outflow prevention portion in the circumferential direction are also covered by the large diameter portion 62 of the cover 60 from one side L1 in the axial L direction. In other words, the large diameter portion 62 functions as a blanking plate to cover the first outflow prevention portions 91L and 91R and the third outflow prevention portion 93. As described above, the large diameter portion 62 of the cover 60 is not in contact with the opening end surface 291 of the case 20, and a gap into which a small amount of melted resin can protrude is created between the opening end surface 291 of the case 20 and the large diameter portion 62 of the cover 60.

In FIG. 9, code A1 indicates the radial position of the sealing position by the O-ring 49 (that is, the position at which the O-ring 49 contacts the cylindrical inside circumferential surface 27 of the case 20); code A2 indicates the radial position of the arc-shaped inside circumferential surface 81 of the welding protrusion 80; code A3 indicates the radial position of the outside circumferential surface of the small diameter portion 63; code A4 indicates the radial position of the arc-shaped inside circumferential surface 74 of the recessed part 73; the radial positions A1, A2, A3 and A4 are arranged in this order from the inner side to the outer side in the radial direction. More on the other side L2 in the axial L direction than the other-side end portion X2 of the welding range X, the first outflow prevention portions 91L and 91R are the gaps that spread over the range from the radial positions A1 to A4; or, more on one side in the axial L direction than the other-side end portion X2 of the welding range X, they are the gaps in the range from the radial positions A3 to A4. The second outflow prevention portion 92 is the gap in the range from the radial positions A1 to A2; the third outflow prevention portion 93 is the gap in the range from the radial positions A3 to A4. In this embodiment, the planar arc-shaped step surface 76 which functions as the outflow regulation portion 95 is formed over the range of the radial positions A1 to A2 within the angle range in which the second outflow prevention portion 92 is arranged. Also, in the angle range in which the first outflow prevention portions 91L and 91R are arranged, the step surface 76 is formed over the range of the radial positions A1 to A4.

(Major Effects of this Embodiment)

As described above, the fluid damper device 10 of this embodiment is configured such that the welding protrusions 80, which are to be welded to the cover 60, are formed on the inside circumferential surface of the case 20 and spaced out in the circumferential direction. On the other side L2 in the axial L direction of the welding range X, within which the welding protrusions 80 and the cover are welded together, the first outflow prevention portions 91L and 91R are formed as part of the outflow prevention portion 90 at the positions circumferentially adjacent to the welding protrusions 80 to properly treat the melted resin which has protruded from the welding part. The outflow prevention portions 91L and 91R are the gaps that are created between the inside circumferential surface of the case 20 and the outside circumferential surface of the small diameter portion 63 of the cover 60 at both sides of the welding protrusion 80 in the circumferential direction. With the gaps, the melted resin (the melted material) protruding from the welding part can properly be treated. For instance, the melted resin can be held from protruding toward the damper chamber 11.

In this embodiment, the second outflow prevention portion 92 is provided as part of the outflow prevention portion 90 more on the other side L2 than the welding range X in the axial L direction and on the radially inner side than the arc-shaped inside circumferential surface 81 of the welding protrusions 80. The second outflow prevention portion 92 is the gap in the radial direction between the arc-shaped inside circumferential surface 81 of the welding protrusion 80 and the outside circumferential surface of the small diameter portion 63 of the cover 60. The third outflow prevention portion 93 is also provided as part of the outflow prevention portion 90 on one side L1 in the axial L direction with respect to the welding range X. The third outflow prevention portion 93 is the gap in the radial direction between the inside circumferential surface (the arc-shaped inside circumferential surface 74) of the case 20 and the outside circumferential surface of the small diameter portion 63 of the cover 60. The second outflow prevention portion 92 can keep the melted resin from protruding toward the damper chamber 11 in the same manner as the first outflow prevention portions 91L and 91R. The third outflow prevention portion 93 can keep the melted resin from protruding out from the gap between the opening portion 29 of the case 20 and the large diameter portion 62 of the cover 60. Therefore, it is less likely that the melted resin protrudes from the gap between the case 20 and the cover 60 to form weld burrs, and thus, a step to remove weld burrs does not need to be added.

Note that, in this embodiment, the second outflow prevention portion 92 and the third outflow prevention portion 93 are connected to the first outflow prevention portions 91L and 91R to configure the continuous outflow prevention portion 90 as a whole; however, the first outflow prevention portions 91L and 91R, the second outflow prevention portion 92 and the third outflow prevention portion 93 may not be connected to each other. Also, the present invention may adopt a configuration without the second outflow prevention portion 92 and the third outflow prevention portion 93 partially or entirely.

The cover 60 of this embodiment has the small diameter portion 63 which is inserted to the end portion (the thin portion 28) of the case 20 and the large diameter portion 62 having a larger diameter than the small diameter portion 63; the small diameter portion 63 is inserted to the case 20 and positioned in the direction perpendicular to the axial L direction by the arc-shaped inside circumferential surface 71 which is formed at the circumferential position different from the position of the welding protrusions 80. Therefore, the cover 60 and the case 20 can be co-axially positioned at the circumferential position different from the welding part. The large diameter portion 62 covers the opening end surface 291 of the case 20, the first outflow prevention portions 91L and 91R and the third outflow prevention portion 93 which is formed at the inside circumferential side thereof from one side in the axial L direction. Therefore, the melted resin protruded to the first outflow prevention portions 91L and 91R and the third outflow prevention portion 93 won't be seen from outside directly, thus, presenting a good appearance. Even if small amount of melted resin protrudes from the first outflow prevention portions 91L and 91R and the third outflow prevention portion 93 and weld burrs are formed, the weld burrs will be blocked from outside by the large diameter portion 62 and won't be seen directly; therefore, it is less likely that a step to remove the weld burrs needs to be added. Further, the large diameter portion 62 is not in contact with the opening end surface 291, it is less likely that the cover 60 will be pushed up by the protruded melted resin. Therefore, a precision of the position of the cover 60 in the axial L direction will not be degraded.

In this embodiment, the outflow regulation portion 95 is provided on the other side L2 of the outflow prevention portion 90 in the axial L direction. For example, the arc-shaped step surface 76, which functions as the outflow regulation portion 95, is provided on the other side L2 of the first outflow prevention portions 91L and 91R and the second outflow prevention portion 92 in the axial L direction. The outflow regulation portion 95 has a plane (the arc-shaped step surface 76) orthogonally intersecting with the axial L direction and is provided more on one side L1 in the axial L direction than the O-ring 49. The inside periphery of the outflow regulation portion 95 is connected to the cylindrical inside circumferential surface 27 (i.e., the inside circumferential surface of the damper chamber), and the inside periphery of the outflow regulation portion 95 has the same diameter as the surface (the cylindrical inside circumferential surface 27) on which the O-ring 49 contacts. Since the outflow regulation portion 95 is provided over such a range, it is less likely that the melted resin protrudes from the gap in the radial direction toward the O-ring 49. Also, the outflow regulation portion 95 is provided within the angle range which corresponds to the welding part; in this embodiment, the outflow regulation portion 95 is provided over the entire range of the welding protrusions and within the angle range including the first outflow prevention portions 91L and 91R at both sides in the circumferential direction thereof. Therefore, it is less likely that the melted resin protrudes from the gap in the circumferential direction toward the O-ring 49.

In this embodiment, the positioning contact portions 70 which contact the small diameter portion 63 of the cover 60 in the axial L direction, which is to be fixed to the opening portion 29 of the case 20, are formed on the inside circumferential surface of the case 20 and spaced out in the circumferential direction. While the positioning contact portions 70 are formed at the different circumferential positions from the welding protrusions 80, one end of the welding protrusion 80 in the axial L direction, the positioning contact portion 70, and the other end of the welding protrusion 80 in the axial L direction appear in this order in the axial L direction. In other words, the welding protrusion 80 is formed over the axial range which accommodates the position of the positioning contact portion in the axial L direction. Therefore, the tip end surface of the small diameter portion 63 is made to contact to the welding protrusions 80 and melted there, and then the small diameter portion 63 is pushed in until contacting the positioning contact portions 70 to position the cover 60 in the axial L direction. With this, the other-side end portion X2 of the welding range in the axial L direction lines up to the level of the height of the positioning contact portion 70 in the axial L direction; therefore, the second outflow prevention portion 92 can be formed on the other side L2 in the axial L direction by the positioning contact portion 70.

In this embodiment, the positioning contact portion 70 is formed at four circumferential positions at the equal interval about the axial line L, which is the radial center of the case 20; out of the four positioning contact portions at the four positions, each of the two at the opposite positions in the radial direction is formed over the range which accommodates the angle position of the rib 261 of the partition protrusion 26. In other words, since the positioning contact portions 70 are formed evenly in the circumferential direction, the positioning of the cover 60 in the axial L direction can precisely be performed, preventing the cover 60 from tilting. Also, since the case 20 and the cover 60 can be welded to each other at the position at which no positioning contact portion 70 is formed, the welding parts can be provided at an equal distance in the circumferential direction. Therefore, the welding parts can be arranged with a good balance in the circumferential direction.

Note that the positioning contact portion 70 and the welding protrusion 80 may not be provided respectively at four positions, but each may be provided at three or two positions. They may also be provided at five or more positions. It is desirable in either case that they be arranged at equal angle intervals; however, they may be arranged at unequal angle intervals. For example, they can be provided at two positions as long as the two positions are at opposite sides from each other in relation to the center of the case 20 in the radial direction, and one of the two positions (i.e., the two positions apart by 180°) may be shifted by a predetermined angle from the straight line extending in the diameter direction of the case. Also, they may be provided at three positions such that two positions out of the three and the one remaining position are arranged on opposite sides from each other in relation to the center of the case 20 in the radial direction. For example, the positioning contact portion 70 can be arranged at three positions which are the vertices of an isosceles triangle. Further, they may be provided at four positions, of which, having the first straight line and the second straight line extending in the diameter direction of the case 20 and mutually intersecting with each other, two positions are at opposite sides on the first straight line in relation to the center of the case 20 in the radial direction, and the other two positions are at opposite sides on the second straight line in relation to the center of the case 20 in the radial direction. In this case, it is desirable that the two positions on the first straight line overlap the rib 261.

Also, the outflow prevention portion 90 is provided in three prevention portions: the first outflow prevention portions 91 and 91R, the second outflow prevention portion 92 and the third outflow prevention portion 93 in this embodiment, and it is more desirable to increase the total capacity of these three portions to be more than the volume of the fusing portion. In this way, all the melted resin can be held in the outflow prevention portion 90. Therefore, it is less likely that the melted resin protrudes to the position at which it contacts the O-ring 49; therefore, it is less likely that the melted resin protrudes out of the case 20 and the cover 60.

What is claimed is:

1. A fluid damper device comprising:
    a bottomed cylindrical case which opens to one side in an axial direction;
    a rotor having a rotation shaft, which is to be inserted in a damper chamber created in said case, and a valve;
    a fluid which is filled in said damper chamber;
    a cover which has a through hole, through which said rotor passes, and is fixed to an opening portion of said case; and
    a sealing member for sealing a gap between an outside circumferential surface of said rotor and an inside circumferential surface of said case;
    wherein welding protrusions, which are to be welded to said cover, are formed on the inside circumferential surface of said case and spaced out in a circumferential direction, and said welding protrusions and said cover are welded together over a predetermined range in said axial direction, and an outflow prevention portion is provided on an inner circumferential side of the inside circumferential surface of said case on the other side in said axial direction of said predetermined range and at positions circumferentially adjacent to said welding protrusions.

2. The fluid damper device of claim 1, wherein an outflow regulation portion is provided on the other side in said axial direction of said outflow prevention portion.

3. The fluid damper device of claim 2, wherein said outflow regulation portion is provided on one side in said axial direction of said sealing member.

4. The fluid damper device of claim 2, wherein said welding protrusions extend to the other side in said axial direction of said predetermined range and is connected to said outflow regulation portion.

5. The fluid damper device of claim 2, wherein said outflow prevention portion is provided from an end portion of said case on one side in said axial direction to said outflow regulation portion continuously.

6. The fluid damper device of claim 1, wherein said outflow prevention portion is provided on the other side of said predetermined range in said axial direction and also on an inner side in a radial direction of said welding protrusions.

7. The fluid damper device of claim 1, wherein said outflow prevention portion is provided on one side of said predetermined range in said axial direction.

8. The fluid damper device of claim 7, wherein
said cover has a small diameter portion which is inserted to said case and welded to said welding protrusions and a large diameter portion which has a larger diameter than said small diameter portion; and
said outflow prevention portion arranged on one side of said predetermined range in said axial direction is covered by said large diameter portion from one side in said axial direction.

9. The fluid damper device of claim 8, wherein
in said case, an arc-shaped inside circumferential surface, which is centered on a center of rotation of said rotor, is provided at a different circumferential position from said welding protrusions; and
said small diameter portion is positioned in a direction perpendicular to said axial direction using said arc-shaped inside circumferential surface.

10. The fluid damper device of claim 1, wherein an inside circumferential surface of said welding protrusions is arc-shaped about the center of rotation of said rotor.

11. The fluid damper device of claim 1, wherein said welding protrusions have tapered surfaces which incline toward an outer side in a radial direction as toward one side in the axial direction.

12. The fluid damper device of claim 1, wherein
a positioning contact portion which contacts said cover in said axial direction is formed at a circumferential position, different from said welding protrusions, on the inside circumferential surface of said case; and
one end of said welding protrusions in said axial direction, said positioning contact portion, and the other end of said welding protrusions in said axial direction appear in this order in said axial direction.

13. The fluid damper device of claim 12, wherein
partition protrusions which circumferentially divide said damper chamber are provided on the inside circumferential surface of said case;
said positioning contact portion is formed at the circumferential position corresponding to said partition protrusions.

14. The fluid damper device of claim 13, wherein
a rib which extends in a radial direction is formed at an end surface of said partition protrusions on one side in said axial direction;
said positioning contact portion is formed over a range which accommodates an angle position of said rib.

15. The fluid damper device of claim 12, wherein
said positioning contact portion is formed at two positions which are opposite from each other about a center of said case in a radial direction.

16. The fluid damper device of claim 15, wherein
said positioning contact portion is formed at two positions which are on a straight line extending in a diameter direction of said case and are opposite from each other about the center of said case in the radial direction.

17. The fluid damper device of claim 12, wherein
said positioning contact portion is formed at three positions which are distanced from each other in the circumferential direction;
two positions of said three positions are opposite from remaining one position of said three positions in relation to a center of said case in a radial direction.

18. The fluid damper device of claim 17, wherein
said positioning contact portion is formed at three positions which are distanced at equal angle intervals in relation to the center of said case in the radial direction.

19. The fluid damper device of claim 14, wherein
said positioning contact portion is formed at four positions which are distanced from each other in the circumferential direction;
two out of said four positions are opposite from each other on a first straight line extending in a diameter direction of said case, in relation to a center of said case in the radial direction, and overlap with said rib in said axial direction;
the remaining two out of said four positions are opposite from each other on a second straight line which extends in the diameter direction of said case and intersects with said first straight line, in relation to the center of said case in the radial direction.

20. The fluid damper device of claim 19, wherein
said positioning contact portion is formed at four positions which are distanced at equal angle intervals in relation to the center of said case in the radial direction.

21. An apparatus with a damper, comprising the fluid damper device of claim 1, wherein
an open/close member which pivots with respect to an apparatus main body is attached to said rotation shaft.

22. The apparatus with a damper of claim 21, wherein said open/close member is a toilet seat of a western-style toilet.

* * * * *